(12) United States Patent
Altheimer et al.

(10) Patent No.: US 6,761,798 B2
(45) Date of Patent: Jul. 13, 2004

(54) METHOD FOR FORMING AN ARUNDO DONAX PAPER PRODUCT

(75) Inventors: Ernett Altheimer, Tacoma, WA (US); Michael P. Wolcott, Moscow, ID (US)

(73) Assignee: Nile Fiber Pulp & Paper, Inc., Seattle, WA (US)

( * ) Notice: Subject to any disclaimer, the term of this patent is extended or adjusted under 35 U.S.C. 154(b) by 0 days.

(21) Appl. No.: 09/741,484

(22) Filed: Dec. 15, 2000

(65) Prior Publication Data

US 2003/0019594 A1 Jan. 30, 2003

Related U.S. Application Data

(63) Continuation-in-part of application No. PCT/US99/13519, filed on Jun. 16, 1999.
(60) Provisional application No. 60/089,596, filed on Jun. 17, 1998.

(51) Int. Cl.[7] .............................. D21C 3/00; D21C 3/02; D21D 1/02
(52) U.S. Cl. .............................. 162/25; 28/97; 28/148; 28/149
(58) Field of Search .............................. 162/24, 97, 82, 162/83, 78, 20, 25, 28, 149, 148; 156/62, 62.2, 62.4; 264/109, 124

(56) References Cited

U.S. PATENT DOCUMENTS

| 3,652,387 A | 3/1972 | Wilder |
| 5,017,319 A | 5/1991 | Shen |
| 5,554,330 A | 9/1996 | Flannery et al. |

FOREIGN PATENT DOCUMENTS

| CA | 2132056 A1 | 3/1995 |
| WO | WO 96/09434 A1 | 3/1996 |
| WO | WO 99/66119 A1 | 12/1999 |

OTHER PUBLICATIONS

"Wheat Straw as a Paper Fiber Source"; The Clean Water Washington Center, 1997.*
Singh, R.P. *The Bleaching of Pulp*, Third Edition, Revised, Tappi Press, Atlanta, GA, 1979, p. 184.
Arundo donax Fact Sheet, *California Exotic Pest Plant Council*, Riverside, California.
Duke, James A., "Arundo donax L.," *Handbook of Energy Crops* (Unpublished), 1984.
Purdue, Robert E., Jr., "Arundo donax: Source of Musical Reeds and Industrial Cellulose," *Agricultural Research Service, U.S. Department of Agriculture*, Beltsville Maryland, 1958, pp17–30.
Taylor, Marsha, "Cultivation of California Arundo Donax," MFA Theis, California Institute of Arts, 1996.

* cited by examiner

*Primary Examiner*—Steve Alvo
(74) *Attorney, Agent, or Firm*—Christensen O'Connor Johnson Kindness PLLC

(57) ABSTRACT

Composite panels and pulp, and paper products of the pulp, are produced from Arundo donax. In the fabrication of the composite panels, Arundo donax is comminuted to a suitable size, combined with a binder, and consolidated into panels that meet standards for construction and/or furniture grade panels. The Arundo donax particulates may be combined with wood particulates to produce a mixed furnish that can be used in the preparation of composite panels. Comminuted Arundo donax is treated, in conventional pulping processes, to produce a high tensile strength pulp that can be used in the production of paper. The pulp has a lighter color than wood pulp, and thereby uses less bleaching chemicals to achieve a desired whiteness. The pulp can be combined with wood pulp to produce a variety of products.

2 Claims, 7 Drawing Sheets

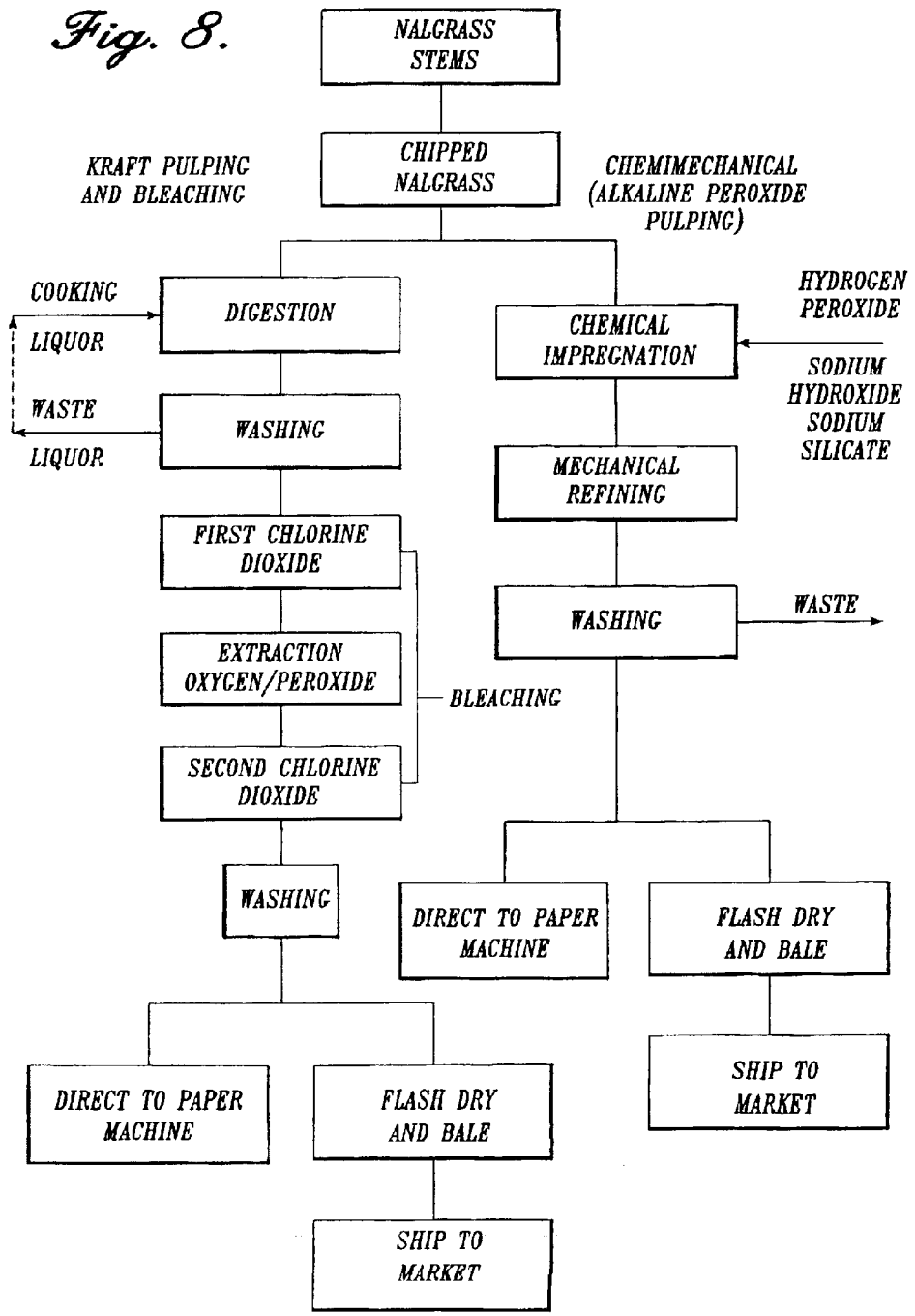

METHOD FOR FORMING AN ARUNDO DONAX PAPER PRODUCT

CROSS-REFERENCE TO RELATED APPLICATIONS

This application is a continuation-in-part of international application number PCT/US99/13519, filed Jun. 16, 1999, which claims the benefit of the priority of the filing date of U.S. patent application Ser. No. 60/089,596, filed Jun. 17, 1998. The benefit of the priority of the filing dates of each is hereby claimed under 35 U.S.C. §§ 120 and 119, respectively. Each of the above-identified applications is incorporated herein by reference in its entirety.

FIELD OF THE INVENTION

The invention pertains to composite panels and engineered products made of Arundo donax (a type of grass), and pulp and paper produced from Arundo donax.

BACKGROUND OF THE INVENTION

There are several well-known technologies for producing particle board, using wood chips and other wood processing waste products. Indeed, these wood-based composite boards have found wide application particularly in building construction and the manufacture of furniture. More recently, the industry has produced oriented strand board (OSB) as a useful construction material. Both particle board and OSB fall into the category of "composites" because both contain a filler (wood fiber) embedded within a binder matrix. Another well-known wood composite is "MDF" (medium density fiber board). Other well known composite products are made with wood or other fibers using inorganic binders, such as cement, to make construction and decorative products.

The popularity of wood-based composites is based in large part on the availability of relatively low cost wood byproducts (chips, sawdust, etc.) that can be used in the composites. Indeed, many of the industry standards for the physical performance of these composites are based on wood-based composites. Since the manufacturing parameters for wood-based composites are well-known, and can often be customized for certain applications, there has been little incentive to investigate other fillers.

With the increasing demand for paper prepared from wood pulp, as well as worldwide demand for wood-based composites (which can substitute for lumber), there is now a perceived growing need for a substitute raw material for wood. While the supply of wood for use in these products is "renewable," it requires setting aside land for long periods of time for tree farming. Moreover, when demand outstrips supply, because supply is based on forecasts of decades before when trees were planted, then a shortage inevitably develops. Since the wood required for these uses results in cutting millions of acres of forest each year, such shortages lead to serious worldwide concerns about large scale deforestation and its contribution to global warming.

There is yet a need for a material that can be readily substituted for wood in wood-based composites, and that can also be used to produce paper pulp for the fabrication of paper products. Extensive research had been conducted and production trials have been made in an effort to find a suitable non-wood fiber for composites and pulp but, until now, this work has met with very little success due to inferior properties, excessive costs and many commercial production drawbacks.

SUMMARY OF THE INVENTION

In one aspect of the invention, Arundo donax particles are provided. The particles, including chips and flakes, can be advantageously formed into pulp from which paper and paper products can be made. The particles can also be used in the production of particle boards.

In another aspect, the invention provides composites that include a binder matrix filled with Arundo donax particulates. In accordance with the invention, these composite boards use significantly less binder than wood-based composites, and exceed several of the physical properties of comparable wood-based composites, as measured by standards used in the industry.

The composites of the invention are produced by selecting nalgrass (a common name for Arundo donax), which is widely distributed as a native wild grass in many parts of the world. The nalgrass is charged to a flaker which contains sharp internal knife edges to reduce the nalgrass to small shards (e.g., flakes), which can then be charged to a hammermill for further size reduction. The resulting material is called a "furnish." The hammermill furnish is sized, preferably into at least two fractions. Each of the two fractions of nalgrass particulates is separately combined with a proportion of a resin. A layered structure, having alternate layers of fine and coarse nalgrass-resin mixture is then produced. The layered structure is subjected to heat and pressure for consolidation into a composite product. Satisfactory products may be made with a single layer, two layers, or more. Many commercial operations blend a variety of wood sources, such as hardwoods, softwoods, and recycled wood waste, in the manufacture of composites. Those skilled in the field will seek the advantages of nalgrass by blending into their furnish a portion of nalgrass with their available wood sources.

The invention also provides paper pulp, and paper products made from nalgrass. The raw pulp produced from the nalgrass is of lighter color than the pulp produced from woods that are typically used in paper production. Accordingly, a smaller amount of chemical bleach must be added to bleach the pulp to a desired whiteness. Nalgrass pulp is also stronger than most common hardwoods, such as aspen. The pulp of the present invention can also be utilized in other cellulose-based products including building products and modified cellulosic fibers such as viscose (e.g., rayon).

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is a schematic flow diagram showing steps in representative processes for producing nalgrass pulp in accordance with the present invention.

DETAILED DESCRIPTION OF THE PREFERRED EMBODIMENT

Figure 1:
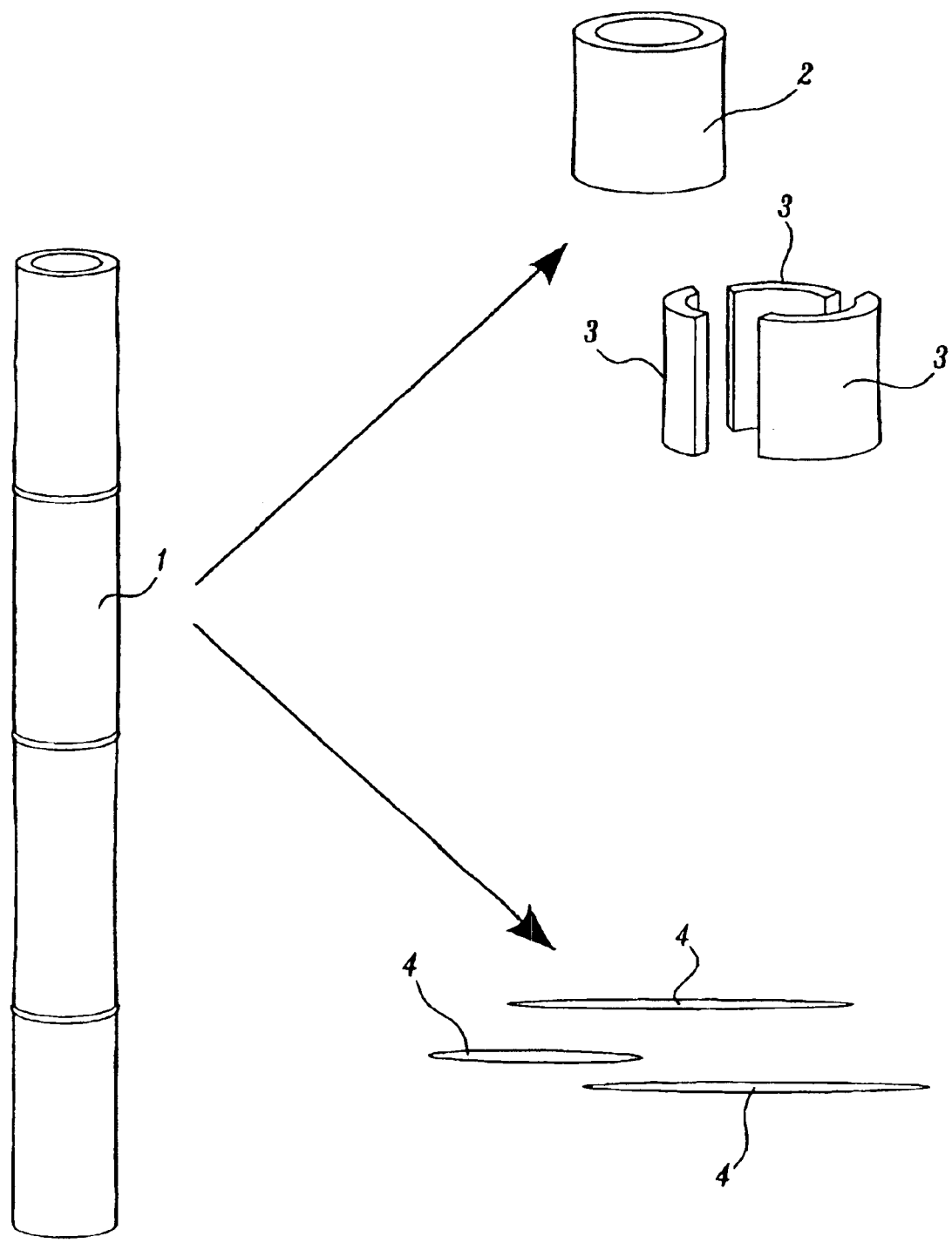
FIG. 1 is an illustration of representative nalgrass particles of the invention.

The composites of the invention utilize a raw material that is abundant, but that has been regarded as a weed, unsuitable for any use other than stabilizing soil on slopes, windbreaks, and the manufacture of woodwind instruments. The raw material is of the genus Arundo of the family Gramineae, tribe Festuccae. It includes about six species, of which Arundo donax L is the most widely distributed and the best known. Arundo donax, also known as "nalgrass," is native to the countries surrounding the Mediterranean Sea. The terms "nalgrass" and "Arundo donax" are used interchangeably herein.

Nalgrass is a tall, erect, perennial grass and at maturity reaches 7-28 feet in height. In optimum climate, it grows at a rate of six inches per day during most of the year and can reach maturity in one to one and a half years. In infertile soils, yields are in the range of 8 tons dry nalgrass material per acre. Test cutting in southern California resulted in yields of more than 30 tons dry nalgrass material per acre. It is estimated that the sustainable yield of dry fiber from 50,000 acres of nalgrass is the equivalent of 1,250,000 acres of tree wood fiber. It is one of the largest of the herbaceous grasses. Unlike bamboo, kenaf, and other grasses, the stalks are hollow, with walls 2 to 7 mm. thick and divided by partitions at the nodes. The nodes vary in length from approximately 12 to 30 cm. The outer tissue of the stem is of a siliceous nature, very hard and brittle with a smooth, glossy surface that turns pale golden yellow when fully mature.

The vascular bundles of nalgrass are distributed freely throughout the cross-sectional area of its fundamental parenchyma. Those toward the periphery of the stem are smaller and more numerous than those toward the interior. These bundles are collateral and are surrounded by one or more rows of thick-walled, strongly lignified fibers. Toward the periphery of the stem, as the size of the bundles decreases, the number of rows of fibers associated with the bundles are small and comparatively close together, the fibers are sufficiently abundant to form a continuous ring of structural tissue within which are scattered the vascular elements. This structural ring is separated from a wax-covered single cell epidermal layer by a narrow band of parenchyma cells that in mature stems are comparatively small, thick-walled, and lignified. The vascular bundles, including the associated fibers interior to the structural fibrous ring, occupy approximately 24% of the stem. The vascular tissue and associated fibers that compose the structural ring make up approximately 33% of the total cross-sectional area. Thus, parenchymatous tissue occupies but 43% of the cross-sectional area of the stem.

Both leaves and stems of nalgrass, particularly the former, contain numerous highly silicified cells. These cells, associated with the vascular bundles, are also located in the epidermal tissue. Their presence explains the elevated silica count that has been indicated by chemical analyses.

The equipment necessary for manufacturing the composites of the invention are commercially available, and may have to be modified to optimize production. Nevertheless, commercially available equipment can readily be used in the process.

In one aspect the present invention provides an Arundo donax particle. The particle is either a chip or a flake and can be used either in the formation of pulp, paper products derived from the pulp or incorporated into composite panels.

The chip is formed from an Arundo donax stem by cutting the stem across its length to provide a ring having a substantially circular cross section in a length from about ⅛ inch to about 3 inches. Breaking the ring's circular cross section provides the chip. Typically, when the ring is broken two to five chips are formed. Referring to FIG. 1, Arundo donax's stem 1 provides ring 2 from which chips 3 are formed. A representative device and method for forming Arundo donax's chips is described in Example 1. Preferably, the ring has a length from about ½ to about 1½ inches and is formed by cutting the stem either by a saw cut, a knife blade or a veneer cut.

In addition to chips, suitable Arundo donax particles include flakes. The flakes are formed from flaking an Arundo donax stem in any one of a number of conventional flakers. Preferably, the flake (i.e., shard, sliver) has a length from about two inches to about four inches and preferably from about 2½ to about 3½ inches. Flake thickness can vary greatly from about 1/32 of an inch to about ⅛ of an inch. Referring to FIG. 1, flaking stem 1 provides flake 4. Suitable flakes can be prepared from conventional equipment including ring, drum, and disc flakers and chippers. Preferably, flakes are formed using a drum flaker.

As discussed below, Arundo donax particles (e.g., flakes and chips) can be advantageously used in the production of composite panels, pulp, and paper products. Chips can be advantageously used in the formation of pulp including continuous or batch pulping processes. Arundo donax flakes can also be pulped, preferably by batch digestion processes. In kraft pulping the flakes and/or chips are directly digested. In CTMP (alkaline peroxide) pulping, the flakes and/or chips can be reduced in size prior to digestion. For composite panel (e.g., particle board) formation, the flakes and/or chips are typically reduced in size by hammermilling to provide a furnish which is then mixed with a binder such as a resinous binder and then consolidated into a panel.

Figure 5:
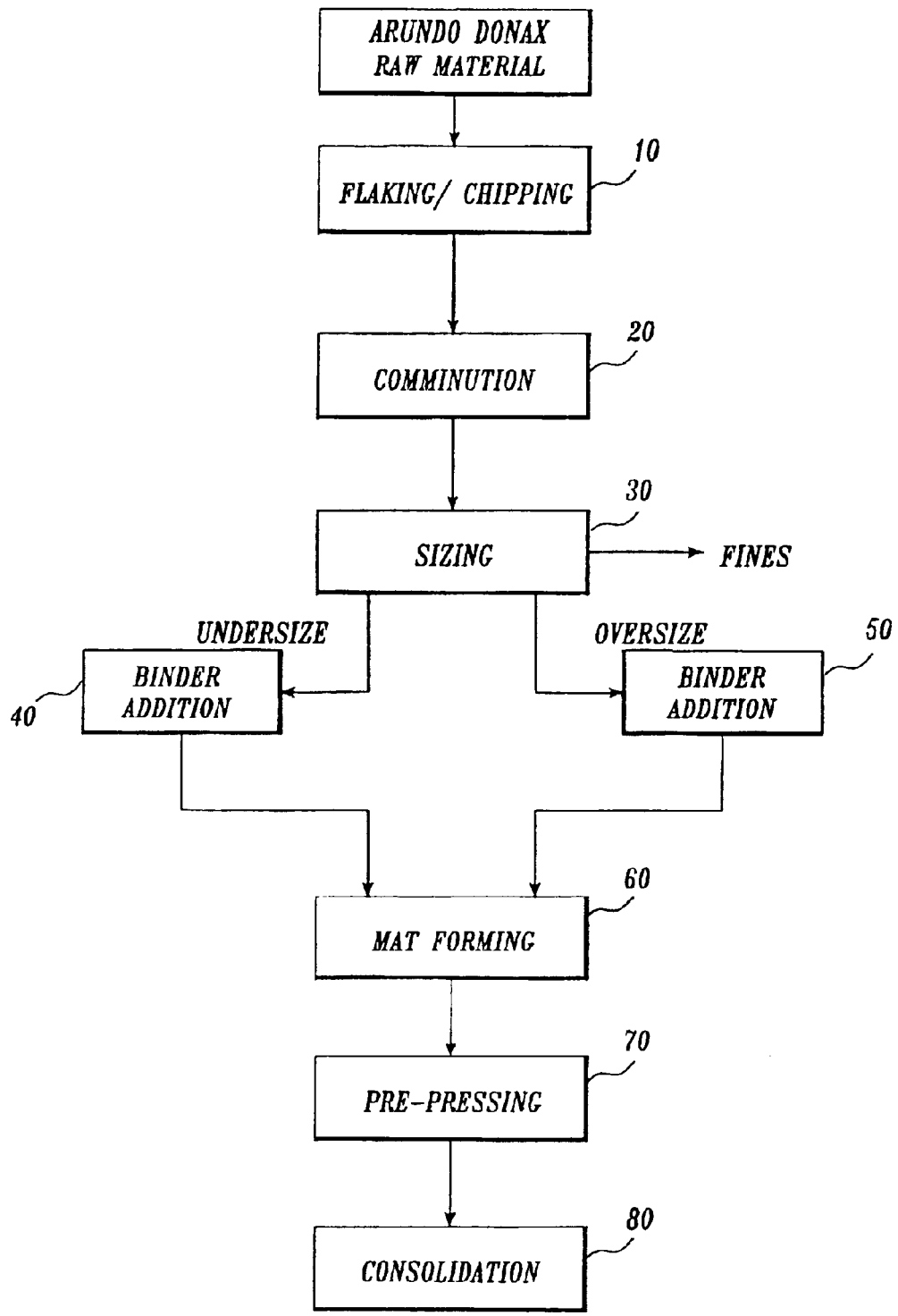
FIG. 5 is a schematic flow diagram showing steps in a representative process for producing the nalgrass composites of the invention.

A representative method for forming a composite panel is illustrated in FIG. 5. Referring to FIG. 5, in a first step clean nalgrass is charged to a flaker or chipper 10 which contains internal sharp edges for cutting the nalgrass to a reduced size. Typically, a size distribution of nalgrass is obtained from the flaker. Preferably, nalgrass particulates having a length of about one inch, and up to about four inches, are produced by the flaker, if the resultant furnish is to be used to manufacture composites. If the particulates are to be used to manufacture paper pulp, then it is preferred that they be smaller, typically in the range one-half inch to about 1½ inches in length.

The nalgrass particulates are then charged to a hammermill 20 for further comminution. It should be understood that other apparatus commonly used for comminution of cellulosic materials may also be used, and that the invention is not limited to the use of flakers, chippers, and hammermills. The hammermill further reduces the size of the nalgrass particulates and produces a size distribution of the furnish.

The particulates from the hammermill are then preferably charged to a series of mesh sieves 30 for sizing. Preferably, the sieves are arranged to produce at least three cuts or size distributions of nalgrass particulates. Thus, it is preferred to use a first sieve of 48 mesh size to remove undersized nalgrass "dust." Thereafter, the oversized particulates are charged to a second sieve of mesh size 14. This sieve produces an undersize and an oversize. Material that does not pass through a 4 mesh (over one-quarter inch) is removed and reworked.

Figure 6:
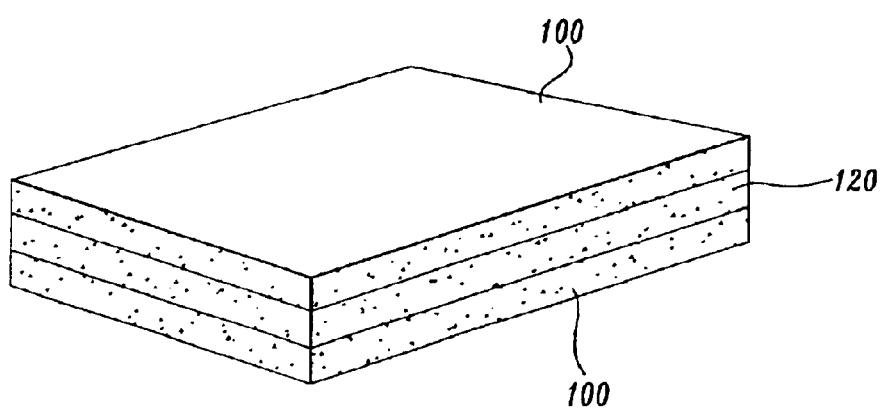
FIG. 6 is a representative nalgrass composite panel prepared in accordance with the invention.

The undersized material is finer and is used to make the "face" layers 100 of the composites shown in FIG. 6. The oversize material, which is relatively coarser, is used for the core layer 120 or layers of the composite. Typically, a composite comprises three layers: a central core covered on each side by a face layer. However, additional layers can also be added, depending upon customer requirements, physical property requirements, and other factors.

The undersize or "face nalgrass particulates" are mixed with a resin 40 to form a "face material mixture" of resin-coated particulates. Separately, the core material is also mixed with the resin to form a "core material mixture."

While any of the organic resins and inorganic binders conventionally used in the manufacture of wood products may also be used to make nalgrass composites, the preferred resin is methyl diisocyanate ("MDI"). It has been found that MDI resin results in the production of composites having superior properties. Without being bound, it is theorized that the nalgrass-MDI resin combination may produce these enhanced physical properties due to a combination of any of the listed physical properties of nalgrass in combination with moieties of the MDI resin molecule: high melting point waxes present in the nalgrass, elevated silica content of the nalgrass, high-alpha cellulose content of the nalgrass, and low lignin content of the nalgrass.

Regardless of theory, it has also been found that the manufacture of nalgrass composites requires a lower proportion of resin additive, than would be required with a wood-based composite of a similar physical dimensions and strength. Indeed, nalgrass composites of the invention may be prepared with as little as 1.5 weight percent MDI. Typically, the resin proportion may range from about 1.5 to about 5 weight percent MDI depending upon the composite physical properties required. More than 5 weight percent MDI may also be used but there appears to be of little commercial advantage to produce such composites. Generally, the higher the proportion of resin added, the stronger the composite. Preferably, the nalgrass-resin mixture contains from about 1.5 to about 3.5 weight percent MDI, and most preferably from about 2.5 to about 3.0 weight percent MDI. Clearly, when a resin other than MDI is used, a different resin proportion may be found optimal, depending upon the physical properties required of the composite.

After the nalgrass-resin mixtures have been prepared, they are conveyed to "mat forming" 60. In this process, the face material mixture is first laid down in a layer. This is followed by a layer of core material mixture, which is covered by a final layer of face mixture, to form a three-layer sandwich. More or less layers can also be used depending upon the desired properties of the resultant composite.

The layered mat is prepressed 70 under ambient conditions to reduce its volume, by allowing limited movement of particulates to fill in interstitial and void spaces. The prepressed layered structure is then pressed, in a conventional press used for the production of wood-based composites, and subjected to sufficient heat and pressure to consolidate the panel 80. When MDI resin is used, the press is typically operated at a temperature in the range of 160–170° C.

(320–340° F.), and under pressure of between 500–600 psi (maximum) during the closing cycle and about 100 psi during the curing cycle.

During pressing, some of the mixture may spread outward, resulting in a relatively uneven edge to the consolidated composite. The panel edges are trimmed, and the board is cut to size to produce a composite board of standard size. The formation of representative nalgrass particle boards and their properties as well as wheatstraw-based particle boards and southern pine-based particle boards is described in Example 2.

As noted above, the nalgrass furnish may be mixed with proportions of wood furnish to prepare composites in accordance with the invention. Preferably, the nalgrass forms the major proportion of the furnish due to its lower cost. The formation of representative nalgrass/southern pine particle boards and their properties are described in Example 3. The mechanical and physical properties of the nalgrass/southern pine blend particle boards are compared to particle boards formed from (1) nalgrass and (2) southern pine in that example.

The Arundo donax composite panel includes a binder matrix and Arundo donax particles (e.g., chips, flakes, and chips and flakes having reduced size) distributed throughout the binder matrix. Referring to Tables 1 and 2, the composite panels of the present invention meet at least the M-3 standard for composite panels.

The panels include from about 1% to about 10% by weight of a resin binder based on the total weight of the panel. However, to achieve the advantageous properties associated with wood panels, the presence of Arundo donax in the composite panels of the present invention permits a much lower amount of binder. Accordingly, the panels preferably include from about 1.5% to about 3.0% by weight of resin binder based on the total weight of the panel. Conventional binders known in the formation of composite panels can be used to provide the panels of the invention. Preferred binders include methyl diisocyanate, urea-formaldehyde, and phenolic binders.

The panels of the present invention can further include other fibers including wood fibers. Preferably, the panels of the invention that include a blend of fibers have from about 10% to about 90% by weight Arundo donax particles based on the total weight of the panel.

Generally, the bending strength and moisture resistance of the panels of the invention are increased proportionally relative to the amount of Arundo donax present in the panel compared to conventional wood-based panels. Generally, the bending strength of the panel is about 55% greater than a similar constituted wood-based panel, and about 5% greater than a similarly constituted wheatstraw-based panel. The moisture resistance of the panel is about 2.6 times greater than a similarly constituted wood-based panel and about 15% greater than a similarly constituted wheatstraw-based panel.

A representative method for manufacturing an Arundo donax composite panel includes the steps of (1) comminuting Arundo donax into particles of a size distribution suitable for use as a furnish in a composite panel: (2) mixing those particles with a binder (e.g., resin) to provide a binder-particle mixture; and (3) consolidating the binder-particle mixture into a composite panel. In the process, the Arundo donax particles are bonded into a contiguous material with the resin. As noted above, the particle-binder mixture can further include other materials such as, for example, wood particles and fibers.

As described above, Arundo donax can be advantageously incorporated into particle board. Similar advantages can be obtained through the incorporation of Arundo donax in oriented strand board (OSB) and medium density fiberboard (MDF). Arundo donax can be incorporated as the sole particular component or as a component in a particle blend.

In another aspect of the invention, nalgrass is utilized as a raw material for the preparation of pulp and paper products produced from this pulp. Arundo donax pulp comprises fibers obtained from the treatment of Arundo donax particles (e.g., chips and flakes). Depending upon the pulp, in addition to treatment, the particles can also be subject to comminution. Comminution can be performed by a number of devices including, for example, a hammermill or a rotary disc refiner.

As discussed below, the pulp can be formed from a number of different treatments including, for example, kraft pulping, soda pulping, alkaline peroxide mechanical pulping (CTMP), sulfite, and other pulping processes known in the art. The pulping process can also include bleaching. In a preferred process, the bleaching step includes Elemental Chlorine-Free bleaching.

The Arundo donax pulp of the present invention has a freeness in a range from about 150–750 CSF and has a brightness of at least about 55% ISO, and preferably at least about 75% ISO.

Figure 7:
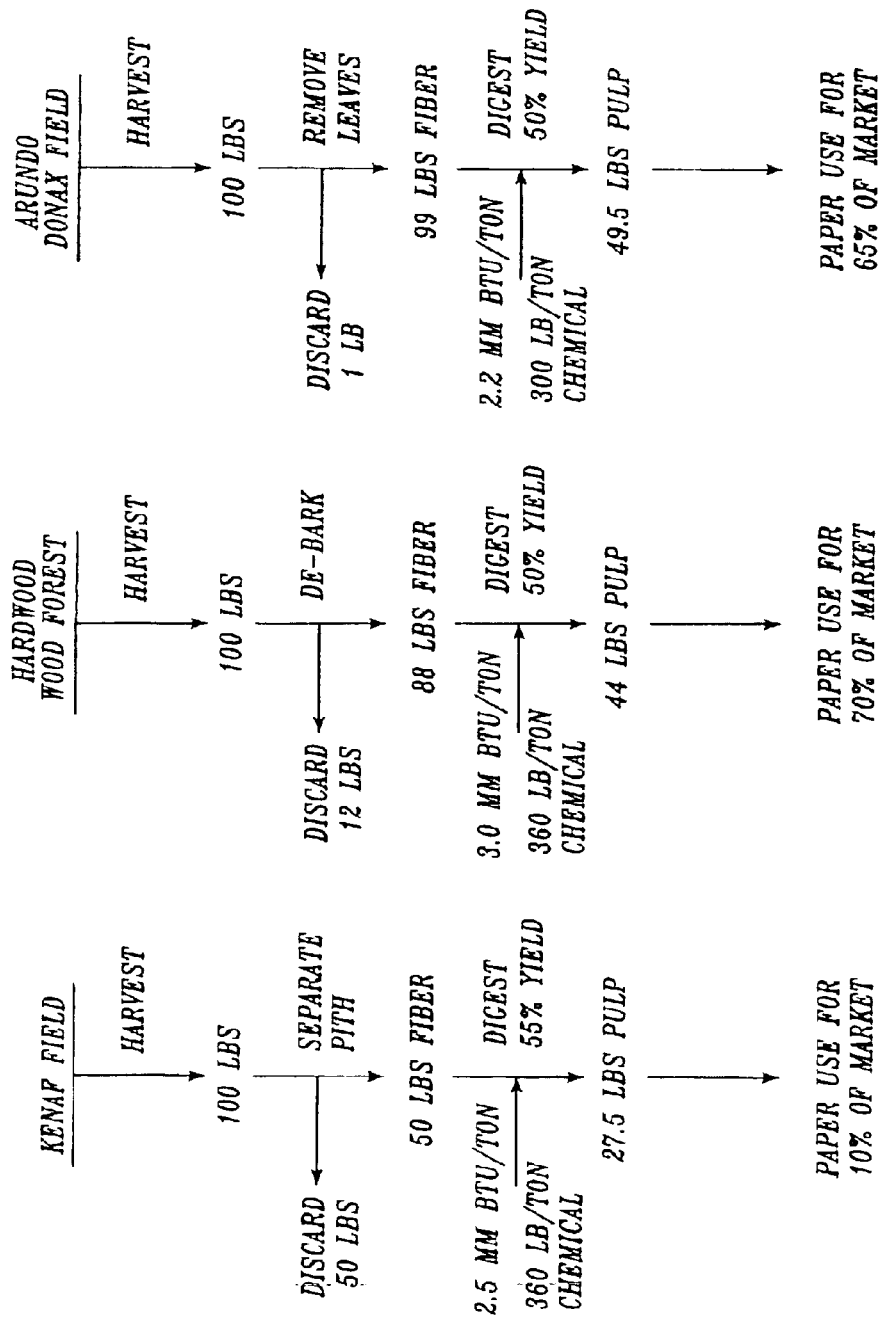
FIG. 7 is an illustration comparing production from kenaf, hardwood, and Arundo donax harvests.

The pulp forming methods of the invention provide a pulp yield of about 50%. The yield is comparable to that of hardwood yields and significantly greater than that obtained from kenaf. The yields obtained from Arundo donax, hardwood, and kenaf are illustrated in FIG. 7. Referring to FIG. 7, the initial yields of usable kenaf, hardwood, and Arundo donax are about 50 pounds/100 pounds, about 88 pounds/100 pounds, and about 99 pounds/100 pounds, respectively. For kenaf, separation of the pith greatly reduces the usable amount of fiber. For hardwood, debarking provides a relatively high amount of fiber for further processing. Arundo donax initial processing removes only the leaves from the stem, which are unusable, leaving the majority of the Arundo donax (i.e., about 99%) usable for further processing. Following initial processing, the kenaf, hardwood and Arundo fibers are then digested with a typical yield being about 50%. As illustrated in FIG. 7, the power (steam requirement, BTU/ton) and chemical requirements (lbs/ton) for pulping Arundo donax is significantly less than for pulping of either kenaf or hardwood fibers. The power requirement for Arundo donax pulping is approximately 88% that of kenaf and about 73% of hardwood digestion. Furthermore, Arundo donax pulping requires about 83% of the amount of the chemicals needed to convert the raw fibers to usable pulp. The overall pulp yields for kenaf, hardwood, and Arundo donax are about 28%, 44%, and 50%, respectively. Thus, the use of Arundo donax in the formation of pulp and subsequent paper products, offers significant economic advantages through lower energy and chemical requirements compared to hardwood and other non-wood materials. As illustrated in the examples, the characteristics of Arundo donax pulp, paper products, and particle boards is generally comparable or superior to wood-based and nonwood-based counterparts.

The pulp has a better tear and tensile strength than aspen pulp. This is an important property affecting paper production efficiency. Also, the nalgrass furnish uses less chemicals and energy to produce pulp.

The bulk density of nalgrass chips is somewhat higher than that of typical wood chips. Accordingly, digester loading would be proportionately higher for nalgrass chips than for wood chips. This is an important consideration for those paper and pulp manufacturers that are limited in capacity due to digester through-put limitations.

In contrast to wood chips, which require a moisture content of about 50 percent for efficient pulping, nalgrass particles having significantly lower moisture content, less than about 10 percent, can be directly and readily digested.

The nalgrass chips or particulates are readily susceptible to digestion, and cook very readily as compared to wood under kraft conditions for wood. The yield of unbleached pulp is of the order of 48.5%, which at the upper end of the range for bleachable kraft pulps, with the possible exception of aspen (which produces yields in the range 55 to 58%). Importantly, the pulp of nalgrass has a lighter color than typically obtained from hardwood. Accordingly, a lower amount of bleaching chemicals is added to produce the same resultant treated brightness. The brown stock produced from nalgrass is very easily bleached with a DEDED sequence to 89.9% ISO brightness at a 93.9% yield. The brown stock can also be readily bleached by the Elemental Chlorine Free (ECF) method, a three-stage method, as described in Example 4 and FIG. 8. In a representative ECF process, pulp brightness of about 85% ISO was obtained.

The weighted average fiber length of nalgrass pulp is about 0.97 millimeter, and the coarseness is of the order of 0.13 milligram per meter. Both of these values are somewhat higher than obtained from aspen pulp.

Nalgrass pulp may be used to prepare paper, such as wood-free uncoated papers, and may also be blended with wood pulps to produce other products. Nalgrass wood pulp is also suitable for the production of corrugating medium. Nalgrass furnish may be blended with wood furnish to produce a mixed pulp product suitable for many uses.

In another aspect of the present invention, methods for forming Arundo donax pulp are provided. In these methods, Arundo donax particles such as chips and flakes are pulped.

In one method, Arundo donax pulp is formed by selecting a furnish that includes Arundo donax particles and subjecting the furnish to a pulping process to produce a brown stock of pulp having a yield of about 48% by weight based on the furnish. Generally, the pulping time for the method, which achieves a 48% yield and a kappa value of about 15, is about 25% less than required for pulping hardwood to achieve the same yield and kappa value.

In another embodiment, the present invention provides a method for forming an Arundo donax pulp that includes the steps of: (1) selecting a furnish that includes Arundo donax particles; (2) subjecting the furnish to a pulping process to produce a brown stock of pulp having a yield of about 48% by weight based on the furnish; and (3) bleaching the brown stock to a brightness of from about 55% to about 90% ISO. In the method, bleaching the brown stock to a brightness of about 90% ISO requires about 25% less bleach than required for bleaching hardwood to about the same brightness.

In another embodiment of the method of the invention. Arundo donax pulp is formed by: (1) subjecting Arundo donax particles to a bleaching chemical to provide a bleached furnish; and (2) mechanically refining the bleach pulp furnish to provide a pulp stock having a brightness of from about 55% to 90% ISO. The bleaching chemicals can be any one of a variety of bleaching chemicals known to those in the pulping art. Preferred bleaching chemicals include a mixture of hydrogen peroxide, sodium hydroxide, and sodium silicate (alkaline peroxide pulping). Alternatively, the bleaching chemical can include chlorine dioxide.

A flow chart illustrating two representative pulping processes is shown in FIG. 8. Referring to FIG. 8, kraft pulping and bleaching and chemimechanical pulping (alkaline peroxide) processes are illustrated. Briefly, in these processes nalgrass stems are processed to form nalgrass particles (e.g., chips and/or flakes). For kraft pulping and bleaching, the nalgrass particles are digested in a cooking liquor. The digested material is then washed and the waste liquor recycled into the cooking liquor for continuous processing. The result of digestion is a pulp product that is then bleached. As illustrated in FIG. 8, bleaching can include the steps of a first chlorine dioxide bleaching step followed by an extraction step which is then followed by a second chlorine dioxide bleaching step. Following bleaching, the pulp is then washed and either directed to a paper machine for paper formation or pressed and dried for shipping to market. The pressed and dried pulp is referred to as market pulp.

For chemimechanical pulping, the nalgrass particles are impregnated with chemical (an alkaline peroxide mixture of hydrogen peroxide, sodium hydroxide, and sodium silicate). Following chemical impregnation, the resulting treated pulp is mechanically refined and then washed. After washing the pulp can either be directed to a paper machine or dried and baled and shipped to market.

In another aspect of the present invention, Arundo donax paper products are provided. The paper products include Arundo donax pulp. The incorporation of Arundo donax pulp into the paper products provides advantageous brightness as well as strength (i.e., burst, tear, and tensile). The utilizing of Arundo donax in the production of paper, its pulping behavior and pulping properties are described in Example 4. In Example 4, data from kraft pulping, soda pulping, and alkaline peroxide mechanical pulping is presented. The results for Arundo donax are compared to those obtained for wheatstraw and wood.

The Arundo donax paper products are generally formed by a method that includes the steps of: (1) forming an Arundo donax furnish that includes fibers and an aqueous dispersion medium (e.g., water); (2) depositing the furnish onto a foraminous support (e.g., a forming wire); (3) dewatering the deposited furnish to provide a fibrous web; and (4) drying the web to provide a paper product.

The Arundo donax paper products of the present invention can further include other materials and can include a pulp blend, such as a blend of Arundo donax and softwood and/or hardwood pulp. Accordingly, in the method described above, the Arundo donax furnish can further include wood fibers.

The advantageous properties of Arundo donax can be obtained by incorporating from about 5% to about 85% by weight Arundo donax pulp in the paper product. Generally, the paper product of the present invention has a brightness of at least about 82% ISO, a burst index of at least about 3.0, a tear index of at least about 8.5, and a tensile index of at least about 50. Depending upon the characteristics of the pulp, the paper products of the present invention include high brightness printing and writing grade paper, news print and publication printing grade, and unbleached liner and corrugation boards.

The following examples are provided for the purposes of illustration and not limitation.

EXAMPLES

Example 1

Equipment, Processes, and Methods for Nalarass Size Reduction

In this example, cutting or macerating nalgrass, more specifically cutting nalgrass into particles that are suitable for processing into digested pulp or for efficient processing into composite panels and/or engineered wood products, is described.

Fairly sophisticated processing equipment has been developed over many years, by the forest and wood products industries, for size reduction of logs, sawmill shavings, waste lumber, etc. The equipment and handling methods have been designed to produce particles of specific geometry for use in modern digesters for the manufacture of pulp and in milling equipment for wood composites, namely, particleboard, oriented strand board (OSB), and medium density fiberboard (MDF). During the development work, several types and models of wood chippers and flakers were tested. The resulting particles were satisfactory for laboratory and pilot scale work but it quickly became evident that such particle geometry was less satisfactory for commercial application.

Generally, the conventional equipment, ring, drum, and disc flakers and chippers, and various tub and agricultural and "roadside/yard" grinders, produced many long flakes, shards, and slivers. The action of these machines tend to pull the hollow nalgrass stems into the blades and shred the long fibers as if peeling layers. Long shards and slivers tend to blind screens and conveyors generally used in pulp digesters and handling equipment used in composite panel plants.

Enough material was screened and recovered during the trials to conduct the scientific work, but it was clear that more work was needed to efficiently reduce nalgrass size for commercial processes. Further investigation has shown that conventional equipment used for wood may not produce satisfactory particle geometry for modern continuous pulp digesters nor for many composite panel processing plants. The desired particle geometry is a chip of ¾ to 1 inch long by ¼ to ¾ inch wide by approximately 3/16 inch thick. (Note: these dimensions apply broadly to most commercial operating mills but could vary somewhat for certain operations.) Further, certain pulping equipment and processes, used principally outside the United States, can utilize a wider range of particle geometry.

Figure 2:
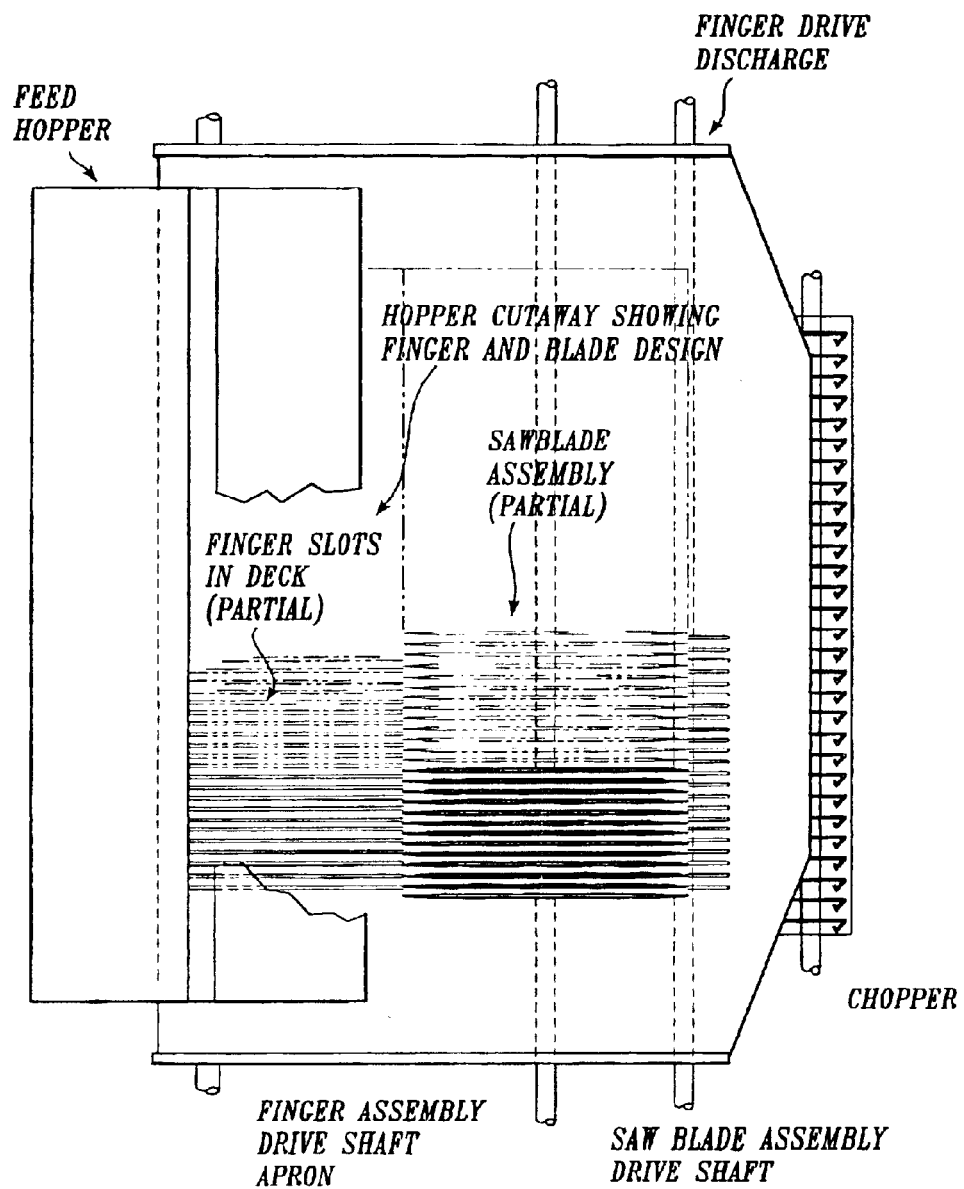
FIG. 2 is a plan view of a representative device for forming nalgrass chips in accordance with the present invention.
Figure 3:
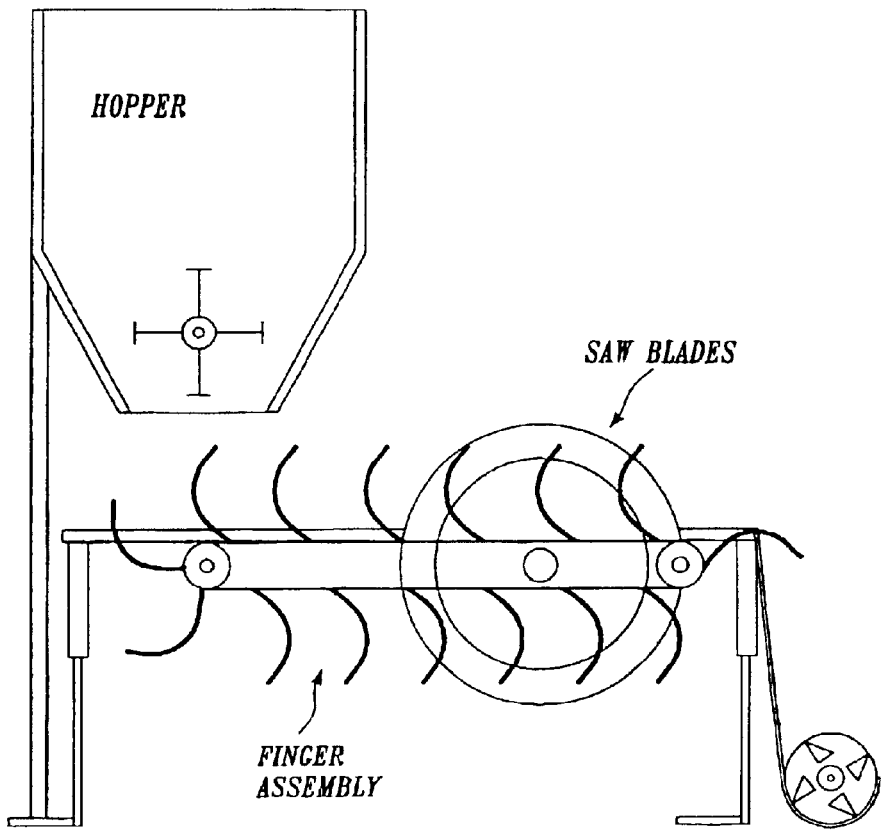
FIG. 3 is an elevation view of a representative device for forming nalgrass chips in accordance with the present invention.
Figure 4:
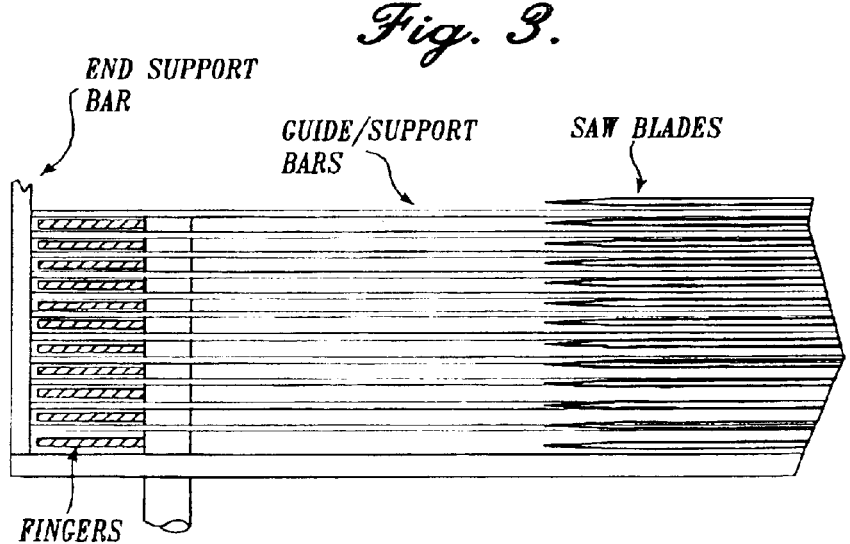
FIG. 4 is a detail section of a blade arrangement for a representative device for forming nalgrass chips in accordance with the present invention.

One representative device and method for preparing desired particle geometry for nalgrass is shown in FIGS. 2-4. This same concept may be applied to upgrading agricultural straws and prunings, roadside and yard clean-up, etc.

The usable stem portion of nalgrass grows from 15 to 20 feet to maturity in 12 to 18 months depending on weather and soil conditions. The stems are harvested by cutting with a blade just above the ground line and the top section, containing leaves and small stems, is removed by a blade cutter in the field. The resulting stems, which are essentially hollow, range from about ½ inch to 1¼ inches diameter with wall thickness ranging from just over 1/16 inch to roughly ¼ inch. The concept is based on sawing the stems into "rings" of ¾ to 1 inch length then, "chopping" the rings into three to five pieces. Simple calculations show that the resulting pieces would meet the optimum size specifications for commercial pulping and composite panel processes.

FIG. 2 is a plane view and FIG. 3 an elevation of a saw blade bed 5½ feet wide with saw blades mounted on a shaft and spaced 1 inch apart. This width was selected for illustration purposes because automatic saws used in composite panel and wood products plants range from 4 to 8 feet in width to cut panels into sections for various products. However, it would be possible to have a much more narrow or wide saw bed depending on economic factors of construction cost and capacity requirements. FIG. 4 is a detail section of the blade and finger arrangement. This illustration shows a circular saw configuration however, a band saw principle can be employed.

Blade spacing of 1 inch is also used for illustration since spacing of ¾ to 1½ inches more or less is possible depending on the desired application. Nalgrass stems are pre-cut to approximately 4 to 5 feet lengths and aligned and fed into the hopper which is mounted above the apron that feeds the saw blade arrangement. Fingers mounted on a chain, belt, or other carrier mechanism are driven through a slot in the belt that feeds into the saw blades. These fingers pull the nalgrass stems that feed by gravity or by a positive feed mechanism (the stems are not completely straight and a positive feed to clear the hopper discharge into the fingers can be used) from the hopper onto the apron into and through the saw blades resulting in rings of nalgrass discharging to a chute that then flows into the chopping mechanism. The width of the fingers for a 1 inch saw blade can be ½ to ¾ inch in order to supply the positive force to gently pull the stems through the blades.

The "chopper" may be one of several possible designs. The representative design shown is of a type with blades mounted on a shaft that can rotate at a single or variable speed. As rings fall into the housing around the blades, they are chopped by the action of the blade impinging on or near the wall. An alternate design uses hammers instead of blades or even a drum with blades and an annular space whereby chunks are pulled from the nalgrass rings. The optimal design produces the fewest small slivers or shards.

After the chopper, a screen removes the oversize (intact or nearly intact rings) for return to the chopper and the undersize slivers and shards are removed by screening. The main stream is conveyed to a holding bin to be loaded into trucks or railcars.

Variations of this basic process are possible. The saw blades may be oscillating if a more positive cutting action is needed. The saw blades may have many or very few or no teeth. Another design, as noted earlier, may use a band saw principle rather than a circular one. The bands would have an up and down motion as the stems are pulled through. Nonetheless, the method involving cutting rings to optimum length then reducing the rings to desired particles is the same in all versions.

A key to many of the design features is the capacity of the system. For general efficiency and adequate customer service to large processing plants, a system in the field would need to produce a minimum of 10 tons/hour up to 30 or more tons/hour and operate effectively 16 hours/day and 6 or 7 days per week, 50 to 52 weeks per year. Tons in this reference are short tons, 2000 lbs., and as "green" tons. In the industry, tonnage frequently means "bone dry tons". Based on the bulk density of the stems, some rough estimated calculations and sketches show that each if each finger "pulled" a small bundle about 10 inches in diameter, roughly 6 to 7 pounds, the fingers would need to pass the blades (about 30 inches in diameter) at a rate of just over one per second to process 10 to 12 tons per hour. Relating that speed to similar types of processes conceptually seems that a speed of 2 to 3 seconds would be needed to accomplish the sawing of a bundle that size. Band saw blades of 30 to 40 inch length could possibly saw bundles up to 15 inches in diameter and that design could process 10 to 12 tons per hour. Larger bundles being pulled through may begin to crush the stems before they can be cut into the desired ring shape.

Example 2

The Formation of Representative Nalgrass Particle Boards

The protocol for manufacturing particle board of nalgrass, and of comparison materials, is described in this example.

Preparing the Furnish (Particles). Arundo donax stalks were chipped into pieces of approximately 2 to 3 in. long×¼ to ⅜ in. wide×0.03 in. thick in a Pallmann Drum Flaker, dried to 8% moisture, and then processed in a Prater Blue Streak hammermill with a ⅛ in. screen. Material from the mill was screened resulting in 32% through the screen to be used for face material and 68% on the screen to be used for core material.

For wood (southern pine) composite preparation, commercially obtained face and core material was used. The commercial face material was coarser than that used for nalgrass and wheatstraw so a portion of the wood face material was screened, using the same mesh screen as used for nalgrass.

For wheatstraw, the straw was processed through the Prater Blue Streak hammermill with a ⅛ in. screen. Material from the mill was screened in the same manner as nalgrass with 24% through the screen to be used for face material and 76% on the screen to be used for core material.

All prepared test materials were processed as follows. Each test had three replications at low (2%), medium (4%), and high (6%) resin content; and low and high density. A total of 18 test panels was used for each material. See Table 1.

Resin/Binder addition. Core material and face material portions were weighed out and individually put into a laboratory blender designed to duplicate production conditions. For each portion, the methyl diisocyanate resin, generally referred to as MDI, was weighed to achieve the target percentage and put into a reservoir that feeds into nozzled spray apparatus. The nozzles were positioned in the blending chamber and sprayed for 60 to 180 seconds while the blender was operating. The blender was stopped and the resin-coated material removed. In all tests, resin content of the face and core materials was the same.

Mat Forming. Two small portions of face material and one of core material were weighed out for each mat to be pressed into a 3-layer test panel. A Teflon® sheet, to ease test panel release after pressing, was placed on a steel sheet, and a rectangular wooden frame placed on the Teflon® sheet. The frame measured 16 in.×20 in., (the target size of the finished test panel) and was 6 in. high. Face material was distributed uniformly inside the frame to form the lower face, then the core material was distributed uniformly over the face layer. Finally, the remaining portion of face material was distributed uniformly as a top layer. The mat formed by the layers was tamped down, the frame removed, and a Teflon® release sheet placed on top of the mat.

Panel Forming. The mat was placed on the lower platen of a Siempelkamp pilot model press. The platen dimensions of the press were 23 in.×31 in. and it was driven by a 200 ton servohydraulic system. A three-stage press schedule was preset on a computer to compress to 0.75 in. in 60 seconds, to remain at that thickness for an additional 400 seconds, and then to vent for 20 seconds for a total press time of 480 seconds. Platen temperature was 330° F. At the end of the press time, the top platen withdrew to its starting distance and the panel was removed and allowed to cool at ambient conditions.

Composite panels were manufactured from nalgrass, wheatstraw, and southern pine. From each panel two specimens were cut and tested in static bending of modulus of rupture, and modulus of elasticity; four for internal bond strength; and one for screw withdrawal. One specimen from six of the 18 panels of each furnish was used to measure water absorption and thickness swell.

Mechanical tests were conducted on ambient-conditioned specimens using a screw-driven universal test machine according to ASTM D1037. with a few exceptions noted below.

Static bending specimens were roughly 2 in.×19 in.×¾ in. instead of 3 in.×20 in.×¾ in. as specified for specimens with thickness greater than ¼ in. The test speed was 0.36 in./min. and the span was 18 in.

Internal bond strength specimens were 2 in.×2 in.×¾ in. and tested at a speed of 0.06 in/min. Centerline and surface breaks were recorded for each internal bond test.

Screw withdrawal specimens were 3 in.×6 in.×¾ in. instead of 3 in.×6 in.×1 in. as specified for face screw withdrawal and 2½ in.×4½ in.×¾ in. for edge screw withdrawal. The test speed was 0.06 in./min. Two edge and two face screw pull tests were conducted on the same specimen.

Water absorption and thickness swell were measured on 6 in.×6 in. specimens after they soaked in distilled water for 2 and 24 hours. Thickness was measured at four locations and averaged for each specimen. Water absorption and thickness swell were determined as a percentage of the unsoaked weight and averaged thickness for each specimen.

All mechanical and physical properties were averaged over the three specimens for each type of panel. The mean values in the graphs in Table 1 (below) represent the averages for the respective panel type.

All tests were conducted according to "Standard Methods of Evaluating the Properties of Wood-Base Fiber and Particle Panel Materials," ASTM D1037. All panels were first cut into 14 inch×19 inch sections. Specimens were cut from these for testing.

Static Bending—Modulus of Rupture (MOR) and Modulus of Elasticity (MOE). Two specimens of 2 in.×19 in. were cut from each panel providing a total of six specimens for each combination of density and resin level. Specimens were placed on a United Model No. SFM-10 screw-driven test machine set for a span of 18 in. A computer assisted program set the test speed at 0.36 in./min. and recorded the elasticity and rupture curves. The six results for each combination were averaged and recorded in Table 1.

Tensile Strength Perpendicular to Surface—Internal Bond (IB). Four 2 in.×2 in. specimens were cut from each test panel. Metal loading blocks were cemented to both faces of the specimen and allowed to cure completely. The blocks were engaged on a Model SFM-10, and tested at a speed of 0.06 in./min. Internal bond breaks were automatically recorded. Test results were averaged for the specimens for each density and resin combination, and recorded in Table 1.

Direct Screw Withdrawal; Perpendicular and Edge. One specimen of each test panel was prepared with two face and two edge pulls per specimen. Face withdrawal specimens were 3 in.×6 in.×¾ in. for face pulls and 2½in.×4½ in.×¾ in. for edge pulls (ASTM D1037 recommends 3 in.×6 in.×1 in.). Standard pilot holes were drilled and standard screws inserted. Specimens were anchored to a platen, screw heads gripped with a loading fixture, then withdrawn by separating the platens at the standard rate of 0.6 in./min. Force required to withdraw the screws was recorded. Test results for specimens with the same combination of density and resin level were averaged, and recorded in Table 1.

Water Absorption and Thickness Swelling. One specimen of 6 in.×6 in. of each combination was immersed in distilled water at ambient temperature for 2 and 24 hours. Thickness was measured at four locations on the specimen using a thickness gauge, and averaged. Weights at each period were recorded. Water absorption and thickness swell were calculated as percent gains over the unsoaked weights, and recorded in Table 1.

TABLE 1

Comparative Test Results for Composites Formed from Nalgrass, Wheatstraw, Southern Pine (coarse) and Southern Pine (fine)

| Resin Level (%) | Type of Furnish | Specific Gravity | MOR (psi) | MOE (psi × $10^6$) | Internal Bond (psi) | Face Screw Pull (lbs) | Edge Screw Pull (lbs) | 2 hour % Water Absorption | 2 hour % Thickness Swell | 24 hour % Water Absorption | 24 hour % Thickness Swell | Grade |
|---|---|---|---|---|---|---|---|---|---|---|---|---|
| 2 | nalgrass | 0.73 | 2710 | 0.499 | 123 | 303 | 243 | 7.2 | 3.6 | 37.1 | 13.2 | M-1,S,2,3 |
| 2 | wheatstraw | 0.7 | 2690 | 0.476 | 46+ | 166 | 181 | 7.8 | 3 | 42.5 | 13.8 | None |
| 2 | s. pine-coarse | 0.71 | 1770+ | 0.321+ | 184 | 313 | 271 | 86 | 25.7 | 97.3 | 29.1 | M-1 |
| 2 | s. pine-fine | 0.7 | 1415+ | 0.272 | 122 | 275 | 221 | 80.6 | 21.8 | 95.7 | 24.5 | None |
| 2 | nalgrass | 0.79 | 3290 | 0.585 | 153 | 391 | 347 | 5.5 | 3.2 | 27.8 | 12.3 | M-1,S,2,3 |
| 2 | wheatstraw | 0.74 | 3275 | 0.533 | 59+ | 205 | 199 | 6.9 | 2.9 | 39.2 | 12.8 | M-1 |
| 2 | s. pine-coarse | 0.76 | 2170+ | 0.389+ | 197 | 375 | 326 | 52 | 24.7 | 79.6 | 35.2 | M-1,S,2 |
| 2 | s. pine-fine | 0.77 | 1940+ | 0.342 | 140 | 298 | 262 | 66.9 | 23.7 | 87.4 | 28.2 | M-1,S |
| 4 | nalgrass | 0.72 | 3250 | 0.528 | 182 | 420 | 355 | 6.4 | 2.4 | 28.2 | 8.2 | M-1,S,2,3 |
| 4 | wheatstraw | 0.7 | 4270 | 0.538 | 103 | 268 | 253 | 5.9 | 1.8 | 35.4 | 10.8 | M-1,S,2,3 |
| 4 | s. pine-coarse | 0.72 | 2510 | 0.394+ | 249 | 342 | 287 | 38.7 | 12.5 | 76.7 | 20.1 | M-1,S,2 |
| 4 | nalgrass | 0.79 | 3930 | 0.618 | 220 | 439 | 400 | 5.1 | 2.3 | 22.5 | 7.8 | M-1,S,2,3 |
| 4 | wheatstraw | 0.76 | 4370 | 0.599 | 119 | 308 | 278 | 4.7 | 1.7 | 28.5 | 9.6 | M-1,S,2,3 |
| 4 | s. pine-coarse | 0.78 | 3200 | 0.473 | 305 | 496 | 389 | 29.2 | 11.3 | 69.9 | 22.9 | M-1,S,2,3 |
| 6 | nalgrass | 0.72 | 3730 | 0.568 | 237 | 437 | 361 | 5.5 | 1.9 | 23.5 | 6.2 | M-1,S,2,3 |
| 6 | wheatstraw | 0.69 | 4500 | 0.582 | 126 | 286 | 283 | 5.1 | 1.6 | 30.1 | 8.8 | M-1,S,2,3 |
| 6 | s. pine-coarse | 0.7 | 2430 | 0.369+ | 324 | 441 | 480 | 26.2 | 5.2 | 79.9 | 15.1 | M-1,S,2 |

TABLE 1-continued

Comparative Test Results for Composites
Formed from Nalgrass, Wheatstraw, Southern Pine (coarse) and Southern Pine (fine)

| Resin Level (%) | Type of Furnish | Specific Gravity | MOR (psi) | MOE (psi x 10^6) | Internal Bond (psi) | Face Screw Pull (lbs) | Edge Screw Pull (lbs) | 2 hour % Water Absorption | 2 hour % Thickness Swell | 24 hour % Water Absorption | 24 hour % Thickness Swell | Grade |
|---|---|---|---|---|---|---|---|---|---|---|---|---|
| 6 | nalgrass | 0.78 | 4460 | 0.645 | 292 | 522 | 486 | 4.6 | 1.8 | 18.6 | 5.6 | M-1,S,2,3 |
| 6 | wheatstraw | 0.76 | 5190 | 0.662 | 153 | 346 | 308 | 4.5 | 1.4 | 25.7 | 8.5 | M-1,S,2,3 |
| 6 | s. pine-coarse | 0.78 | 3380 | 0.51 | 343 | 488 | 452 | 13.2 | 2.7 | 51.6 | 15.9 | M-1,S,2,3 |

+ Denotes the properties that limit grade acceptance.
MOE and MOR are averages of two specimens with three replications.
Internal bond is average of four specimens with three replications.
Water absorption is one specimen with one replication.
Screw pulls are averages of two specimens with three replications.

The results show that at a 2 weight percent resin level and low density trial, the nalgrass composite exceeds the maximum for the highest industry grade standard for medium density particleboard (ANSI; M-3) whereas neither the wood composite nor the wheatstraw composite meets even the minimum grade standard (ANSI; M-1). See Tables 1 and 2. The 2 weight percent nalgrass composite shows significantly less water absorption and thickness swell than the wood-based composites. Moreover, the internal bond strength of nalgrass is significantly higher than that of the wheatstraw composite which fails to meet minimum standards. These superior physical properties are also apparent at the 4 and 6 weight percent resin levels.

With regard to the screw pull test, the nalgrass composites perform at least as well as the wood-based composites, and exceeds significantly the performance of wheatstraw composites. The modulus of elasticity (MOE) of nalgrass exceeds that of wheatstraw and wood-based composites, for almost every level of resin addition, except at the 6 weight percent level. At this level of resin addition, wheatstraw composite appears to have a slightly higher modulus of elasticity.

With regard to modulus of rupture (MOR), nalgrass composite again exhibits superior performance as compared to wood-based composite. The wood composite fails to make the minimum (M-1) industry grade standard. When compared to wheatstraw composite, nalgrass composite is superior when the resin level is low, such as 2 weight percent. As the resin level increases, wheatstraw composite MOR exceeds that of the nalgrass composites. This demonstrates one of the advantages of nalgrass composite, namely, that good physical properties are achievable at low resin levels.

Example 3

The Formation of Representative Nalgrass/Southern Pine Particleboards

In this example, the formation of particle boards containing nalgrass/southern pine blends is described. The mechanical and physical properties of the particle boards compared to particle boards formed from (1) nalgrass and (2) southern pine.

Tests were conducted to compare the mechanical and physical properties of nalgrass, southern pine, and nalgrass/southern pine particleboard. For each furnish type, panels were manufactured with target densities of 42 lb/ft³ and 47 lb/ft³ and resin levels of 2% and 4%. All specimens were tested in static bending, internal bond strength, face and edge screwholding, water sorption, and thickness swell. Mechanical properties were compared with product specifications for medium density particleboard (ANSI A208.1-1993). See Table 2.

TABLE 2

Grade Specifications of Medium Density Particleboard
(National Particleboard Association ANSI A208.1-1993)

| Grade | MOR (psi) | MOE (ksi) | IB (psi) | FSP (lb) | ESP (lb) |
|---|---|---|---|---|---|
| M-1 | 1595 | 250 | 58 | NS | NS |
| M-S | 1813 | 276 | 58 | 202 | 180 |
| M-2 | 2103 | 326 | 65 | 225 | 202 |
| M-3 | 2393 | 399 | 80 | 247 | 225 |

An electrically heated, computer automated hot-press was used to manufacture all panels. The press was equipped with nominal 23×31 inch platens, which were driven by a 200 ton servo-hydraulic system. The press was controlled using platen position with a three-stage press schedule that included: (1) press closing for 60 seconds; (2) panel pressing for 400 seconds; and (3) venting for 20 seconds. The platen temperature was 330° F. All panels were formed to dimensions of 16×20×¾ inch, but trimmed to 14×19×¾ inch.

Panels were manufactured from nalgrass, southern pine, and nalgrass/southern pine at target densities of 42 lb/ft³ and 47 lb/ft³ and diphenylmethane diisocyanate (MDI) resin levels of 2% and 4%. Twelve panels of each furnish were manufactured at the different combinations of density and resin loading (i.e., three panel replicates per combination). From each panel two specimens were cut and tested in static bending for modulus of rupture and elasticity, four for internal bond strength, and one for water sorption/thickness swell. One specimen from four of the twelve panels of each furnish was used to measure face and edge screw holding capacity. Each specimen had a different density and resin level.

Mechanical tests were conducted on ambient-conditioned specimens using a screw driven universal test machine in general accordance to ASTM D 1037. Static bending specimens were nominally 2×19×3¼ inch (ASTM specifies dimensions of 3×20×3¼ inch for specimens with thickness greater than ¼ inch). The test speed was 0.36 in/min and the span was 18 inches. Internal bond strength specimens were 2×2×3¼ inch and the test speed was 0.06 in/min. Screwholding specimens were 3×6×3¼ inch for face screwholding (ASTM specifies dimensions of 3×6×1 inch) and 2½×4½×¾ for edge screwholding. The test speed was 0.06 in/min. The two edge and two face screwholding tests were conducted on the same specimen. Water sorption and thickness swell were measured on 6×6 inch specimens after they soaked in distilled water for 24 hours. Thickness was measured at five locations, and averaged for each specimen.

A three-way analysis of variance (ANOVA) was performed on all mechanical and physical properties using density, resin level, and furnish as the three factors.

In general, for each density and resin level combination, the modulus of rupture (MOR) and modulus of elasticity (MOE) significantly increased as the proportion of nalgrass particles within them increased (Table 3). In contrast, the internal bond strength (IB) of panels consisting predominantly of nalgrass particles were significantly lower than similar panels made predominantly of southern pine particles. For face (FSP) and edge (ESP) screwholding, there were few significant differences between any of the panels. For the most part, all panels exceeded the highest grade specifications as stipulated by ANSI A208. 1-1993 (Table 2).

TABLE 3

Average Mechanical Properties of Various Nalgrass, Southern Pine and Nalgrass/Southern Pine Particleboards

| Furnish Nalgrass: Southern pine | Target Density (lb/ft$^3$) | Resin Loading (psi) | MOR (psi) | MOE (ksi) | IB (psi) | FSP (lb) | ESP (lb) | Highest Grade Acceptance |
|---|---|---|---|---|---|---|---|---|
| 100:0 | 42 | 2 | 2709 (183) | 500 (19) | 123 (17) | 303 (48) | 243 (29) | M-3 |
| 80:20 | 42 | 2 | 2467 (194) | 493 (33) | 148 (22) | 303 (160) | 253 (6) | M-3 |
| 60:40 | 42 | 2 | 2343 (229) | 464 (280) | 158 (17) | 317 (18) | 314 (97) | M-2 |
| 40:60 | 42 | 2 | 2210 (152) | 416 (230) | 147 (16) | 327 (1) | 274 (32) | M-3 |
| 20:80 | 42 | 2 | 2362 (283) | 429 (262) | 167 (14) | 314 (12) | 278 (21) | M-3 |
| 0:100 | 42 | 2 | 1769 (119) | 321 (10) | 184 (18) | 313 (46) | 271 (33) | M-S |
| 100:0 | 42 | 4 | 3252 (238) | 529 (17) | 182 (14) | 420 (65) | 355 (36) | M-3 |
| 80:20 | 42 | 4 | 3414 (2440) | 527 (19) | 201 (34) | 357 (5) | 301 (30) | M-3 |
| 60:40 | 42 | 4 | 3263 (258) | 521 (24) | 223 (20) | 386 (61) | 375 (19) | M-3 |
| 40:60 | 42 | 4 | 3176 (228) | 526 (18) | 230 (35) | 384 (8) | 341 (60) | M-3 |
| 20:80 | 42 | 4 | 2807 (577) | 458 (63) | 238 (28) | 443 (6) | 357 (18) | M-3 |
| 0:100 | 42 | 4 | 2272 (410) | 363 (54) | 249 (50) | 343 (50) | 288 (53) | M-2 |
| 100:0 | 47 | 2 | 3297 (286) | 586 (22) | 153 (19) | 391 (37) | 347 (22) | M-3 |
| 80:20 | 47 | 2 | 3069 (327) | 583 (17) | 173 (20) | 338 (18) | 341 (6) | M-3 |
| 60:40 | 47 | 2 | 3111 (309) | 581 (8) | 170 (34) | 409 (16) | 369 (20) | M-3 |
| 40:60 | 47 | 2 | 2736 (185) | 499 (12) | 163 (41) | 380 (16) | 324 (1) | M-3 |
| 20:80 | 47 | 2 | 2993 (204) | 516 (23) | 199 (30) | 439 (14) | 404 (18) | M-3 |
| 0:100 | 47 | 2 | 2230 (180) | 390 (26) | 197 (31) | 392 (44) | 327 (52) | M-2 |
| 100:0 | 47 | 4 | 3297 (265) | 618 (15) | 220 (19) | 439 (64) | 401 (40) | M-3 |
| 80:20 | 47 | 4 | 4301 (487) | 666 (570) | 253 (26) | 442 (8) | 410 (40) | M-3 |
| 60:40 | 47 | 4 | 3852 (298) | 597 (24) | 275 (22) | 512 (64) | 461 (2) | M-3 |
| 40:60 | 47 | 4 | 3883 (452) | 632 (24) | 273 (34) | 517 (18) | 499 (15) | M-3 |
| 20:80 | 47 | 4 | 3933 (219) | 580 (15) | 272 (28) | 498 (4) | 429 (40) | M-3 |
| 0:100 | 47 | 4 | 3202 (289) | 473 (22) | 305 (27) | 496 (38) | 390 (42) | M-3 |

For all furnishes, mechanical properties generally increased as density level increased from 42 lb/ft$^3$ to 47 lb/ft$^3$ and as resin level increased from 2% to 4%.

The three-way ANOVA indicated that resin level, density, and furnish statistically influenced all mechanical properties. The effect of panel density in relation to material IB strength was dependent on resin loading, while the effect of resin loading in relation to material MOE was dependent on furnish type.

After soaking in distilled water for 24 hours the water sorption and thickness swell of the panels containing a higher proportion of nalgrass particles were in general lower than panels incorporating a higher proportion of southern pine particles (Table 4).

TABLE 4

Average Physical Properties of Various Nalgrass. Southern Pine and Nalgrass/Southern Pine Particleboard

| Furnish Nalgrass:Southern Pine | Target Density (lb/ft$^3$) | Resin Loading (psi) | WA 24 Hour (%) | TS 24 Hour (%) |
|---|---|---|---|---|
| 100:0 | 42 | 2 | 37.1 | 13.3 |
| 80:20 | 42 | 2 | 61.5 (5.4) | 23.6 (0.9) |
| 60:40 | 42 | 2 | 79.7 (2.9) | 27.3 (0.3) |
| 40:60 | 42 | 2 | 89.7 (1.0) | 28.8 (1.6) |
| 20:80 | 42 | 2 | 79.3 (5.4) | 29.7 (0.6) |
| 0:100 | 42 | 2 | 97.3 | 29.2 |
| 100:0 | 42 | 4 | 28.2 | 8.2 |
| 80:20 | 42 | 4 | 27.8 (1.6) | 10.2 (0.6 |
| 60:40 | 42 | 4 | 50.2 (3.5) | 16.4 (0.2) |
| 40:60 | 42 | 4 | 63.3 (7.8) | 18.3 (0.4) |
| 20:80 | 42 | 4 | 69.8 (4.9) | 19.6 (0.5) |
| 0:100 | 42 | 4 | 76.7 | 20.1 |
| 100:0 | 47 | 2 | 27.9 | 12.3 |
| 80:20 | 47 | 2 | 39.0 (2.3) | 18.7 (1.6) |
| 60:40 | 47 | 2 | 64.0 (7.9) | 27.2 (2.2) |
| 40:60 | 47 | 2 | 80.7 (1.5) | 32.4 (2.3) |
| 20:80 | 47 | 2 | 79.3 (5.4) | 30.5 (0.2) |
| 0:100 | 47 | 2 | 79.6 | 35.3 |
| 100:0 | 47 | 4 | 22.6 | 7.8 |
| 80:20 | 47 | 4 | 19.3 (0.8) | 8.7 (0.1) |
| 60:40 | 47 | 4 | 32.5 (5.0) | 12.4 (1.3) |
| 40:60 | 47 | 4 | 50.4 (14.1) | 17.9 (2.1) |
| 20:80 | 47 | 4 | 63.7 (4.6) | 21.2 (0.1) |
| 0:100 | 47 | 4 | 70.0 | 23.0 |

Values in parentheses indicate associated standard deviations.

Water sorption and thickness swell after 24 hours generally decreased as density level increased from 42 lb/ft$^3$ to 47 lb/ft$^3$ and as resin level increased from 2% to 4%. The three-way ANOVA indicated that the effect of panel density in relation to thickness swell was dependent on furnish type, while the effect of resin loading in relation to both thickness swell and water sorption was dependent on furnish type.

Generally, the use of nalgrass particles would be best to obtain panels of superior strength and stiffness. The addition of southern pine particles to a furnish, by an amount as low as 20%, although slightly affecting panel strength and stiffness, significantly increases internal bond strength.

As panel density and resin loading increased mechanical properties increased. In a commercial market, however, panels of the lower density and lower resin loading would be economically preferable while still attaining wide grade acceptance.

Panels made predominantly from nalgrass particles exhibited preferable water sorption and thickness swell characteristics to panels made predominantly from southern pine particles. Water sorption and thickness swell, after 24 hours water submersion, were generally reduced by an increase in panel density and resin loading.

Example 4

Utilization of Arundo Donax in Paper Production: Kraft and Alkaline Peroxide Mechanical Pulping In this example, the utilization of Arundo donax (nalgrass) in the production of paper is described. The pulping behavior and pulp properties of nalgrass is also described. Data from kraft pulping, soda pulping, and alkaline peroxide mechanical pulping of nalgrass is presented.

The tests were to be performed on laboratory and small pilot plant scale. The Pulp and Paper Science Department of the University of Washington was selected for kraft and soda pulping tests and the Department of Wood and Paper Science at North Carolina State University for the alkaline peroxide mechanical pulping tests. All testing of handsheet paper samples was made by the Pulp and Paper Science Department of the University of Washington.

Kraft pulping was found to proceed rapidly and resulted in relatively high yields of easily bleached pulp. Average fiber length was high compared to other nonwood materials and, in fact, slightly higher than that from aspen hardwood. Strength properties were better than aspen hardwood kraft in tear and tensile.

Raw Material. Material for the present study was cut fresh from growths in Orange County, California and shipped without drying to the University of Washington.

The nalgrass stem has a dense ring of tissue surrounding a hollow core. Stem diameters are typically ¾ to 1¾ inches in diameter. It can be cut or milled into lengths similar to wood chips and once crushed to break the circular cross section has bulk density similar to that of wood chips (Table 5).

TABLE 5

| | Bulk Density | | |
|---|---|---|---|
| | Nalgrass | Wheatstraw | N.W. Softwood |
| Uncompacted, green BD lb/ft3 | 10.8 | 2–6 | 12–14 |
| Compacted, green BD lb/ft3 | 12.5 | 3–7 | 12–15 |

In earlier tests, nalgrass chips were used. Material for the present trials was cut into precise lengths using a band saw then crushed. For the kraft pulping trials tests were made at four different cut lengths, ½, 3/4, 7/8 and 1¼ inches.

The character of chipped material is important to processing into conventional pulping equipment. The bulk density of the chipped material is important in terms of packing into digesters and sizing of conveyors and other process equipment. The high bulk density of chipped nalgrass will allow it to be processed in conventional, existing chip handling and pulping equipment. Cooking liquor to raw material ratios can be low, similar to those used for wood chips resulting in high waste liquor concentrations.

The other important chip characteristics is the ability of the cooking chemicals to penetrate into the center of the chip during pulping. Earlier tests were done with hammermill prepared chips and were screened to remove fines and oversized material. It was noted that there were some long pieces (2 inch) that might hinder material flow if they were not removed early in the processing sequence. The material gave pulp with low uncooked rejects, indicating that the penetration of cooking liquor was quite uniform.

A sample of dried material was also included. This was cut to ⅞ inch length and was included to evaluate whether liquor penetration was hindered by drying as is the case with wood chips.

Kraft Pulping and Beaching

Kraft Pulping. Kraft cooking of the nalgrass material was made at the University of Washington using a pilot digester system. Cooks were made with each of the chip samples under conditions aimed at producing delignification to the 20 kappa level suitable for bleaching. Pulping conditions are given in Table 6.

TABLE 6

Pulping Conditions for Chips Size and Type Evaluation

| Chip Size (inch) | ½ | ¾ | ⅞ | 1-¼ | Veneer Cut | Dry |
|---|---|---|---|---|---|---|
| H-Factor | 850 | 850 | 850 | 850 | 850 | 850 |
| Temp (C) | 170 | 170 | 170 | 170 | 170 | 170 |
| Liquor/Reed | 4.5 | 4.5 | 4.5 | 4.5 | 4.5 | 4.5 |
| EA (%) | 15 | 15 | 15 | 15 | 15 | 15 |
| Sulfidity (%) | 24.4 | 24.4 | 24.4 | 24.4 | 24.4 | 24.4 |
| Kappa No | 17.4 | 14.0 | 17.6 | 18.2 | 14.6 | 14.9 |
| Rejects (%) | 1.1 | 0.9 | 3.6 | 3.2 | 0.2 | 3.3 |

All samples cooked with similar results. The cooking time is short as indicated by the low H Factor (a chemical reaction value combining temperature and reaction time). Cooking times would be up to half those of softwoods. The high bulk density of the nalgrass chips also allowed use of a low liquid to chip ratio similar to that used for wood chips. This indicates that nalgrass pulping could be made in the same equipment as wood chips and with the same heat economy. Typical low density straw and other nonwood plant material require high liquor to wood ratios although cooking is rapid as found with this nalgrass material.

The four various lengths of chips show only small, probably insignificant, differences in pulping response. Although the ¾ inch chip had slightly lower kappa, 14.0 vs. 17.6–18.2 for the longer chips, the ½ inch chip gave 17.4 kappa. The uncooked rejects were lower in the short cut chips, 0.9–1.1%, compared to the longer chips, 3.2–3.6%, but these levels are low, indicating that uniform penetration of cooking liquors into the material occurred and also showing that the nodes cooked well. The nodes of grasses, of which nalgrass is a member, are sometimes resistant to pulping.

The veneer cut chips cooked similarly to the saw cut chips, giving low kappa, 14.6, and low rejects, 0.2%. This type of chip preparation would be satisfactory for commercial operations.

The dried material showed pulping response similar to the fresh material, kappa 14.9, rejects 3.3%, indicating that there are no problems with the penetration of liquor into dry nalgrass chips. This means that chips could be used from fresh or dry material without significant changes in process conditions.

The pulping of the ⅞ inch cut nalgrass is compared to typical hardwood and softwood kraft pulping in Table 7. The nalgrass cooks more rapidly than both types of wood, requires less chemical and produces only slightly higher rejects (a not significant difference).

TABLE 7

Pulping Conditions for 7/8 Inch Chip Size Compared to Wood Chips

| Material | 7/8 inch Nalgrass | Hardwood Typical | Softwood Typical |
|---|---|---|---|
| H-Factor | 850 | 1200 | 1800 |
| Temp (C.) | 170 | 170 | 170 |
| Liquor/Material | 4.5 | 4.5 | 4.0–4.5 |
| EA (%) | 15 | 17 | 18 |
| Sulfidity (%) | 24.4 | 25.0 | 25.0 |
| Kappa No | 17.6 | 25 | 28 |
| Rejects (%) | 3.6 | 3.0 | 1.5 |

Bleaching. Most published work on the bleaching of nonwood material is made using the now outdated Chlorine (C), Extraction (E), Hypochlorite (H) bleach sequence. Worldwide this sequence is typically used but it is not now acceptable environmentally in the U.S. to meet present environmental standards bleaching of kraft pulp has to be with an Elemental Chlorine Free (ECF) method. Bleaching tests were made on pulp from a larger scale cook on the ⅞ inch cut material using an ECF bleach consisting of Chlorine dioxide (Do). Extraction with oxygen and peroxide (Eop). Chlorine dioxide (D1). The results are shown in Table 8.

TABLE 8

Bleach Response

D.Eop.D. Bleach Sequence-0.20 Kappa Factor

| Stage | Do | Eop | D1 |
|---|---|---|---|
| Consistency (%) | 10 | 10 | 10 |
| Kappa Factor | 0.2 | — | — |
| Time (min) | 30 | 90 | 120 |
| Temp (C.) | 60 | 100 | 70 |
| O2 (psi) | — | 30 | — |
| H2O2 (%) | — | 0.7 | — |
| NaOH (%) | — | 1.7 | — |
| ClO2 (%) | 1.34 | — | 1.5 |
| pH | 3.3 | 9.5 | 3.4 |
| Brightness (% ISO) | — | — | 83.84 |

D.Eop.D Bleach Sequence-0.25 Kappa Factor

| Stage | Do | Eop | D1 (run 1) | D1 (run 2) |
|---|---|---|---|---|
| Consistency (%) | 10 | 10 | 10 | 10 |
| Kappa Factor | 0.2 | — | — | |
| Time (min) | 30 | 90 | 120 | 120 |
| Temp (C.) | 60 | 100 | 70 | 70 |
| O2 (psi) | — | 30 | — | |
| H2O2 (%) | — | 0.7 | — | |
| NaOH (%) | — | 1.7 | — | |
| ClO$_2$ (%) | 1.68 | — | 1.25 | 1.5 |
| pH | 3.3 | 9.5 | 3.4 | |
| Brightness (% ISO) | — | — | 85.6 | 86.4 |

Initially, a chlorine dioxide charge in the first stage of 0.20 kappa factor (percentage equivalent chlorine/kappa number) was applied, followed by 1.5% chlorine dioxide in the third stage. This resulted in a brightness of 83.8%. Modification to a 0.25 kappa factor application in the first stage resulted in brightness of 85.6 and 86.4 with 1.25% and 1.5% chlorine dioxide in the third stage, respectively.

A total chlorine dioxide charge of 3.18% was required for the 86.4. In earlier tests, a brightness of 90.0 was reached in a five stage bleach using 4.34% chlorine dioxide. Softwood kraft pulps typically require 5.8 to 6.2% chlorine dioxide to reach a brightness level of 90.0%.

Handsheet Properties. Standard testing of pulp properties was made using TAPPI procedures. Pulp from the ⅞ inch chip sample was beaten in a PFI mill to various freeness levels. The PFI mill is a standard laboratory pulp beating apparatus used to simulate refining in commercial papermaking operations. Typically the initial pulp freeness of 600 to 750 ml CSF is reduced to about 400 to 500 ml before papermaking to develop strength properties, tensile strength is increased with some small loss of tear strength.

Handsheets were made from ⅞ inch of cut nalgrass pulp beaten to several freeness levels and tested for strength properties, (Table 9). Pulps from the other chip cut lengths were beaten to the 400 ml CSF level for comparison.

TABLE 9

Handsheet Strength Tests

| Chip Size (inch) | PFI (K) | Freeness (ml) | Burst Index | Tear Index | Tensile Index |
|---|---|---|---|---|---|
| seven-eighth | 0 | 700 | 2.51 | 3.99 | 41.55 |
|  | 1 | 605 | 3.80 | 10.39 | 63.50 |
|  | 2 | 488 | 4.75 | 9.38 | 72.42 |
|  | 3 | 415 | 5.10 | 9.15 | 78.93 |
|  | 3.2 | 404 | 4.48 | 9.38 | 75.10 |
|  | 3.6 | 391 | 5.01 | 9.40 | 78.29 |
| half-inch | 0 | 733 | 2.56 | 4.69 | 39.36 |
|  | 3.2 | 413 | 4.78 | 8.78 | 77.60 |
| three-fourth | 0 | 700 | 3.11 | 3.99 | 49.82 |
|  | 3.2 | 393 | 5.08 | 9.30 | 79.98 |
| one and one-fourth | 0 | 709 | 3.07 | 4.24 | 47.22 |
|  | 3.2 | 393 | 5.25 | 9.04 | 81.21 |

The initial pulp freeness before beating was 700 ml CSF which is a very high and desirable level compared with typical nonwood material. In earlier tests a similar high initial freeness of 630 ml CSF was found These compare to >700 ml for softwood pulps and 600-650 for hardwood pulps and are favorably high, allowing the papermaker to modify the pulp properties without restriction and to allow high drainage in the papermaking operation.

The handsheet strength measurement, burst, tensile and tear, are all at favorable levels and higher than those obtained in earlier tests. Comparison of the two sets of results from nalgrass and from typical wheatstraw, kenaf, hardwood and softwood are shown in Table 10. The nalgrass has remarkably high strength in all categories. The sheet bulk is high compared to other nonwoods which indicates the material has significantly different characteristics than the straws.

TABLE 10

Comparison of Nalgrass with Other Pulps

|  | Nalgrass A | Nalgrass B | Wheatstraw | Whole Kenaf | Aspen Kraft | D Fir Kraft |
|---|---|---|---|---|---|---|
| Freeness, ml | 400 | 400 | 400 | 400 | 400 | 400 |
| PFI Mill, revs. | 3200 | 900 | 400 | — | 464 | 8100 |
| Burst Index | 4.5 | — | — | 5.5 | 2.1 | 6.8 |
| Tear Index | 9.4 | 8.7 | 3.7 | 10 | 7.6 | 22.4 |
| Tensile Index | 75 | 53 | 40 | 65 | 46 | 92 |
| Bulk, cc/g | — | 1.59 | 1.24 | — | 1.43 | 1.81 |
| Brightness, % | 86 | 90 | 85 | — | 89 | 89 |

Example 5

Caustic Peroxide Cooking of Arundo Donax

In this example, the caustic peroxide cooking of Arundo donax (nalgrass) is described. Flakes of Arundo Donax obtained from Orange County, Calif. were evaluated under a variety of cooking conditions using alkali (e.g., potassium hydroxide and/or sodium hydroxide) in combination with hydrogen peroxide. A series of experiments were conducted varying cooking lime and temperature.

In one method, sodium hydroxide (10 percent by weight based on oven dry chip basis) and hydrogen peroxide (5 percent by weight based on oven dry chip basis) were used and the chips cooked for 90 minutes at 90° C. The chips were dramatically softened and then broken down by mechanical action. A Morden hydropulper and Sprout lab refiner were used to process the chips. The yields from the method were in the range from about 65 to about 70 percent. The resulting pulp had a brightness in the range from about 45 to about 50 (unbleached). The tensile index was greater than about 50 Nm/g for all conditions.

The alkali and peroxide at high temperature results in the breakdown of the waxy portion of the Arundo Donax particles. The waxy material has been determined to be detrimental in traditional chemithermomechanical pulping (CTMP) processes for fiber-to-fiber bonding.

Arundo Donax can be processed utilizing existing secondary fiber pulping technology by, for example, mills that repulp old newsprint (ONP) or old magazines (OMG). These processing methods include a hydropulper using alkaline chemistry with hydrogen peroxide. In the method, Arundo Donax chips or flakes are allowed to sit in a hydropulper for a period of time under the prescribed conditions, then either (1) while from the first chemical treatment, or (2) at the end of the cooking period, the chips or flakes are broken down by the mechanical action of the hydropulper. The pulp/cooked chips or flakes can then be pumped to an additional mechanical stage such as, for example, a refiner or a kneader. The pulp then sees further mechanical action as it is being pumped back to the hydropulper. The result is an enhancement of the overall yield in the process.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for forming an Arundo donax paper product, comprising:
    (a) selecting a furnish comprising Arundo donax particles;
    (b) subjecting the furnish to a pulping process to provide a pulp, wherein the pulping process comprises cooking the furnish using an H-factor of about 850;
    (c) beating the pulp to a CSF level of 391 to 488 ml;
    (d) depositing the pulp onto a foraminous support;
    (e) dewatering the deposited pulp to provide a fibrous web; and
    (f) drying the web to provide a paper product having a burst index of at least about 3.0, a tear index of at least about 8.5, a tensile strength at least about 50 and brightness of at least about 82% ISO.

2. The method of claim 1 wherein the Arundo donax furnish further comprises wood fibers.

* * * * *

UNITED STATES PATENT AND TRADEMARK OFFICE
CERTIFICATE OF CORRECTION

PATENT NO. : 6,761,798 B2
DATED : July 13, 2004
INVENTOR(S) : E. Altheimer

It is certified that error appears in the above-identified patent and that said Letters Patent is hereby corrected as shown below:

Title page,
Item [12], Inventor, "Altheimer et al." should read -- Altheimer --
Item [75], Inventors, "[75] Inventors: Ernett Altheimer, Tacoma, WA (US); Michael P. Wolcott, Moscow, ID (US)" should read -- [75] Inventor: Ernett Altheimer, Tacoma WA (US) --
Item [56], References Cited, OTHER PUBLICATIONS, insert
-- McDonald, "The Pulping of Wood", McGraw Hill Bood [sic] Company, New York, pp. 422-428, 1969. --

Signed and Sealed this

Eighth Day of February, 2005

JON W. DUDAS
*Director of the United States Patent and Trademark Office*